Patented June 12, 1951

2,556,879

UNITED STATES PATENT OFFICE 2,556,879

METHOD OF STABILIZING ALIPHATIC SULFONYL-CHLORIDES

Joseph S. Lann, Collins Park, and Madison Hunt, Claymont, Del., assignors to E. I. du Pont de Nemours & Company, Wilmington, Del., a corporation of Delaware No Drawing. Application April 2, 1949, Serial No. 85,258

7 Claims. (Cl. 260—543)

This invention relates to a method of improving the clarity, color, and odor of aliphatic sulfonyl chlorides, and more particularly to a method of inhibiting the rapid discoloration of such products upon standing.

It has been observed that the sulfonyl chlorides prepared by the action of sulfur dioxide and chlorine on saturated hydrocarbons in the presence of actinic light are substantially colorless, when freshly prepared, but rapidly turn dark on standing at room temperatures. This darkening is accelerated by heat.

The precise cause of such discoloration is not clear to us at present. It has been suggested that the darkening is due to decomposition of the sulfonyl chlorides, forming various intermediate compounds which polymerize into dark components. The said decomposition is often attended by liberation of $SO_2$ and HCl, which give the principal composition a sharp, objectionable odor.

In any event, the darkening of the material is generally objectionable on its own merit. Thus, one of the important uses of sulfonyl chlorides of hydrocarbons containing from 6 to 25 carbon atoms is in tanning animal hides to produce a white tanned leather. In this tanning process it is clearly of advantage to use a light-colored sulfonyl chloride mixture. Other uses for aliphatic sulfonyl chlorides are as intermediates in the preparation of esters, amides, salts, and the like. In these latter preparations, wherever light-colored products are desired, it is of advantage to use light-colored sulfonyl-chloride intermediates.

It is accordingly an object of this invention to provide a method for preparing aliphatic sulfonyl chlorides of improved clarity, color and odor. Further important objects of this invention will appear as the description proceeds.

Now, we have discovered that aliphatic sulfonyl chlorides of the aforementioned class can be stabilized against discoloration and odoriferous decomposition by the simple device of adding to the material a small quantity of a bicyclic terpene, such as alpha or beta pinene. By small quantity, we mean from 1% to 10% by weight, based on the weight of the aliphatic sulfonyl chloride, but larger quantities may be employed where additional, special effects are desired. Furthermore, other additives which per se have more or less capacity to act as stabilizers may be added in small quantities in addition to the terpene. Such additives are, for instance, compounds containing the ethoxide ring

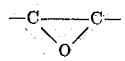

and generally referred to as epoxide compounds, and compounds containing ethoxy groups in a chain, as for instance the compounds formed by the action of ethylene-oxide upon various aliphatic or aromatic compounds having reactive groups such as $NH_2$, OH or COOH.

Without limiting our invention, the following examples are given to illustrate the same.

Example 1

300 grams of No. 40 oil (a Pennsylvania mineral oil fraction of boiling range 265°–300° C.) was treated with a gaseous stream of chlorine and sulfur-dioxide (in accordance with U. S. Patent No. 2,428,733) while being irradiated with an ordinary projector flood lamp, until the mass gained 100 grams in weight. The water-white product, which contained about 40% of the initial, unreacted oil and about 60% of oil containing sulfonyl-chloride groups, was freed from dissolved gases by applying a water pump vacuum at 50 mm. absolute pressure for about 5 minutes.

To 100 grams of the degassed liquid mixture were added 3 grams of alpha pinene, and the mixture was allowed to stand at room temperature in a glass bottle. As a control, 100 grams of the untreated degassed chloro-sulfonylated reaction mixture was allowed to stand under the same conditions. The following results were observed:

At any period of observation (from 1 hour to 59 days) the stabilized sample was clearer than the control sample. At the end of 59 days, the unstabilized sample had the odor of $SO_2$ and HCl, while the stabilized sample had only the odor of pinene.

Example 2

Using the procedure described in Example 1, 300 grams of a purified $C_{20}$, paraffinic hydrocarbon was gassed with sulfur dioxide and chlorine until the contents had gained 100 grams in weight. To 100 grams of the degassed reaction product 20 grams of alpha-pinene were added, and the resulting mixture was allowed to stand at room temperature. The relatively larger quantity of pinene in this example was used to assist in dissolving the unreacted portion of the reaction-product. A control sample of 100 grams of the same degassed wax sulfonyl-chloride reaction-product, containing no stabilizer, was allowed to stand under the same conditions. Results observed:

At any period of observation, from immediately to 73 days, the stabilized sample was clearer and of lighter color than the control sample.

Example 3

100 grams of the sulfonyl-chloride of No. 40 oil prepared as in Example 1 were treated with 2 grams of alpha-pinene and 3 grams of cyclohexene oxide. This mixture was allowed to stand at room temperature and compared with an unstabilized control of the same sulfonyl-chloride. Results observed:

At all stages over a period of 46 days, the stabilized sample was clear and of a light yellow color while the control sample soon became cloudy and developed a dark brown color.

Example 4

The sulfonyl-chloride of No. 40 oil was prepared as indicated in Example 1, and 100 grams of the product were treated with 3 grams of alpha-pinene and 3 grams of a commercial product consisting of the condensation product of a $C_{18}$-alcohol with about 20 moles of ethylene oxide. This mixture was allowed to stand at room temperature and compared with an unstabilized control of the same sulfonyl-chloride. Results observed:

Over a period of observation covering 107 days, the stabilized sample was of a lighter color than the control sample.

Example 5

The sulfonyl-chloride of No. 40 oil was prepared as indicated in Example 1, with the exception that the degassing step was replaced by washing with dilute sodium carbonate solution. Then 100 grams of the sulfonyl-chloride were treated with 5 grams of alpha-pinene and allowed to stand at room temperature, the color being compared with that of an unstabilized control sample. Results observed:

Over a period of 79 days, the stabilized sample was constantly lighter in color compared to the control sample, although both samples developed some cloudiness.

Example 6

The sulfonyl-chloride was prepared and washed by the method described in Example 5, and 100 grams of the product was mixed with 3 grams of alpha-pinene and 2 grams of diisobutylcarbinol. The mixture was allowed to stand at room temperature and compared with an unstabilized control sample of the sulfonyl chloride. Results observed:

Both samples developed cloudiness, but the stabilized sample remained constantly lighter in color than the control sample, over a period of 79 days.

Example 7

The polysulfonyl chloride of a $C_{20}$ paraffin hydrocarbon wax was prepared by the method described in U. S. P. 2,197,800, the treatment with the gaseous mixture being continued until 300 grams of the wax gained 150 grams in weight. The product was degassed by blowing with air for one hour, and 100 grams of the degassed product were mixed with 19 grams of alpha-pinene and 2 grams of a condensation product of technical oleyl alcohol with 2.5 moles of ethylene oxide. This mixture was allowed to stand at room temperature and compared with an unstabilized control sample of the sulfonyl-chloride. Results observed:

Over a period covering 72 days, the stabilized sample was found clearer and of a much lighter color than the control sample.

In all of the examples cited above, the unstabilized control had a strong acid odor of $SO_2$ and/or HCl whereas the stabilized sample exhibited little or no acid odor.

In a similar manner other bicyclic terpenes may be used for the same purpose, for instance camphor, camphene, white camphor oil, dipentene or terpineol, but their effect, weight for weight, is not so good as that of $\alpha$-pinene.

Without any intent to limit our invention thereby, we venture the theory that the stabilizing action of the terpenes is due to their capacity to react with HCl and $SO_2$ which may be liberated by the decomposition of the oily sulfonyl-chloride, thereby eliminating or reducing whatever catalytic effect these acid-by-products may have of the further decomposition of the principal product.

Other additive stabilizing agents which may be employed in conjunction with $\alpha$-pinene according to this invention are hydrogen peroxide, and other per compounds in the presence of water, such as organic peroxides, hydroperoxides, per acids, etc.; amines, such as dibutylamine or tributylamine; formaldehyde or formaldehyde-liberating compounds, such as trioxane; tertiary alcohols, such as tertiary amyl alcohol; certain olefinic compounds, such as myrcene or pentene-2; epoxides such as cyclohexene oxide, 3 - phenoxy - propylene-oxide, epichlorhydrin; ethoxy compounds, such as the condensation products of from 2 to 20 moles of ethylene oxide with 1 mole of any of the following: dodecyl phenol, ethylene glycol, monoalkyl ethers of ethylene glycol, stearic acid, castor oil, $C_{12}$ to $C_{20}$-alcohols, $C_{12}$ to $C_{20}$ alkyl amines, etc.

It has been observed that sulfonyl-chlorides which have become dark colored by lack of proper stabilization may be bleached to a light color by the use of small amounts of 30% hydrogen peroxide (say from 3 to 20%, based on the weight of the sulfonyl-chloride) or with gaseous chlorine. This method may be used to good advantage in conjunction with our present invention, by first bleaching the dark-colored sulfonyl-chloride with hydrogen peroxide, separating off the aqueous layer, and then stabilizing the resulting light-colored, mild-odored sulfonyl-chloride with a small amount of pinene, or admixtures therewith of an epoxide compound, or an ethylene oxide condensation product.

We claim as our invention:

1. The method of stabilizing an aliphatic sulfonyl-chloride against discoloration in storage, which comprises adding to the same, as a stabilizing agent, a bicyclic terpene selected from the group consisting of alpha-pinene, beta-pinene, camphor, camphene, camphor oil, dipentene and terpineol, the quantity of said terpene being not less than 1% based on the weight of the aliphatic sulfonyl chloride being stabilized.

2. A method according to claim 1, the terpene being alpha-pinene.

3. A method according to claim 2, the quantity of terpene being from 1 to 10% by weight, based on the weight of the material being stabilized.

4. The method of stabilizing an aliphatic sulfonyl-chloride against discoloration in storage, which comprises adding to the same, as a stabilizing agent, a mixture of a bicyclic terpene as defined in claim 1 and cyclohexene-oxide.

5. A composition of matter comprising an aliphatic sulfonyl chloride and, as a stabilizing agent therefor, a bicyclic terpene selected from the group consisting of alpha-pinene, beta-pinene, camphor, camphene, camphor oil, dipentene and terpineol in quantity not less than 1% by weight based on the weight of said aliphatic sulfonyl chloride.

6. A composition of matter as in claim 5, said bicyclic terpene being alpha-pinene.

7. A composition of matter as in claim 5, said stabilizing agent being a mixture of alpha-pinene and cyclohexene oxide.

JOSEPH S. LANN.
MADISON HUNT.

No references cited.